United States Patent
Bashir et al.

(10) Patent No.: US 10,112,769 B2
(45) Date of Patent: Oct. 30, 2018

(54) FLEXIBLE INTERMEDIATE BULK CONTAINER (FIBC)

(71) Applicants: SAUDI BASIC INDUSTRIES CORPORATION, Riyadh (SA); STARLINGER & CO GMBH, Vienna (AT)

(72) Inventors: Zahir Bashir, Riyadh (SA); Klaus Niederl, Fahrafeld (AT); Reinhard Lechner, Weissenbach (AT)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 166 days.

(21) Appl. No.: 15/118,621

(22) PCT Filed: Jan. 22, 2015

(86) PCT No.: PCT/EP2015/051212
§ 371 (c)(1),
(2) Date: Aug. 12, 2016

(87) PCT Pub. No.: WO2015/121042
PCT Pub. Date: Aug. 20, 2015

(65) Prior Publication Data
US 2017/0043946 A1    Feb. 16, 2017

(30) Foreign Application Priority Data

Feb. 13, 2014   (EP) ..................................... 14155066
Feb. 17, 2014   (EP) ..................................... 14155443

(51) Int. Cl.
| | |
|---|---|
| *B65D 88/16* | (2006.01) |
| *B32B 5/02* | (2006.01) |
| *B32B 5/12* | (2006.01) |
| *B32B 27/12* | (2006.01) |
| *B32B 27/36* | (2006.01) |
| *D01D 5/42* | (2006.01) |
| *D01F 6/62* | (2006.01) |
| *B65D 25/42* | (2006.01) |

(52) U.S. Cl.
CPC .......... *B65D 88/1612* (2013.01); *B32B 5/024* (2013.01); *B32B 5/028* (2013.01); *B32B 5/12* (2013.01); *B32B 27/12* (2013.01); *B32B 27/36* (2013.01); *B65D 25/42* (2013.01); *B65D 88/1681* (2013.01); *B65D 88/1687* (2013.01); *D01D 5/426* (2013.01); *D01F 6/62* (2013.01); *B65D 2588/162* (2013.01); *Y10T 428/1362* (2015.01)

(58) Field of Classification Search
CPC .. Y10T 428/1362; B65D 88/00; B65D 88/16; B65D 88/1612; B65D 88/1618; B65D 88/1631; B65D 88/37; B65D 88/1668; B65D 88/1675; B65D 88/1681; B65D 88/1687; B32B 5/024; B32B 5/028; B32B 5/12; B32B 27/12; B32B 27/36
See application file for complete search history.

(56) References Cited

U.S. PATENT DOCUMENTS

| | | |
|---|---|---|
| 4,207,937 A | 6/1980 | Sandeman et al. |
| 4,493,109 A | 1/1985 | Nattrass |
| 4,664,957 A | 5/1987 | Van De Pol |
| 8,360,642 B2 | 1/2013 | Sun |
| 2011/0097524 A1* | 4/2011 | Bashir .................... C08J 5/18 428/35.5 |

FOREIGN PATENT DOCUMENTS

| | | |
|---|---|---|
| EP | 1411007 A1 | 4/2004 |
| GB | 2063816 A | 6/1981 |
| GB | 2224006 A | 4/1990 |
| GB | 2462335 A | 2/2010 |
| JP | 2001234447 A | 8/2001 |
| WO | 2009130032 A2 | 10/2009 |
| WO | 2012041482 A1 | 4/2012 |
| WO | 2013087200 A1 | 6/2013 |
| WO | 2015121042 A1 | 8/2015 |

OTHER PUBLICATIONS

International Search Report for International Application No. PCT/EP2015/051212; International Filing Date: Jan. 22, 2015; dated Apr. 1, 2015; 5 Pages.
Machine Translation of JP2001234447(A); Date of Publication: Aug. 31, 2001; 14 Pages.
Written Opinion of the International Searching Authority for International Application No. PCT/EP2015/051212; International Filing Date: Jan. 22, 2015; dated Apr. 1, 2015; 4 Pages.

* cited by examiner

*Primary Examiner* — Walter Aughenbaugh
(74) *Attorney, Agent, or Firm* — Cantor Colburn LLP

(57) ABSTRACT

The present invention relates to Flexible Intermediate Bulk Containers (FIBC) having a body made of flexible fabric woven from polymeric tapes, and transport loops, wherein the body comprises side walls, bottom and top parts, characterised in that the fabric of at least one of the side walls and transport loops is woven from uniaxially-drawn PET tape having a density greater than 1.333 g/cm$^3$.

19 Claims, No Drawings

FLEXIBLE INTERMEDIATE BULK CONTAINER (FIBC)

CROSS REFERENCE TO RELATED APPLICATIONS

This application is a 371 of International Application No. PCT/EP2015/051212, filed Jan. 22, 2015, which claims priority to European Application Nos. 14155443.6, filed Feb. 17, 2014, and 14155066.5, filed Feb. 13, 2014, which are incorporated herein by reference in their entirety.

The present invention relates to Flexible Intermediate Bulk Container (FIBC) having a body made of flexible fabric woven from polymeric tapes, and transport loops, wherein the body comprises side walls, bottom and top parts.

A Flexible Intermediate Bulk Container (also referred to as FIBC, big bag or bulk bag), Super Sack (trademark), Jumbo bags (trademark), is a container in large dimensions for storing and transporting dry, flowable products, for example sand, fertilizers, chemicals and granules of plastics. FIBCs are most often made of thick polypropylene woven tape fabric, either coated or uncoated, and normally measure around 110 cm or 45-48 inches in diameter and vary in height from 100 cm up to 200 cm or 35 to 80 inches. FIBCs from woven PE tape are also used, but it is a much smaller segment than the PP FIBC. The FIBCs capacity is normally around 1000 kg or 2000 lbs., but the larger units can store up to 2000 kgs. Transporting is done on either pallets or by lifting it from the loops. Bags are made with one, two or four lifting loops (cross corner loops). The single loop bag is suitable for one man operation as there is no need for a second man to put the loops on the loader hook. Emptying is made easy by a special opening in the bottom such as a discharge spout, of which there are several options, or by simply cutting it open. As the container is made from a woven textile, it has a flexible character. This allows empty FIBCs to be folded and compressed into a bale and then transported to a production factory, where it can be inflated with air to occupy its volume, and then filled.

WO2009/130032 in the name of one of the present applicants relates to Flexible Intermediate Bulk Container (FIBC) having a body made of flexible fabric woven from polymeric strips, and integral handling devices, wherein the fabric is woven from opaque oriented polyethylene terephthalate (PET) strips having a density of from 500 to 1300 kg/m<3> and a tensile strength of at least 250 MPa. This document is silent about whether the FIBCs made from microporous PET tape meet international safety requirements.

GB 2462335 discloses a flexible container in the form of a bulk bag or sack that comprises, or is associated with, a reflective material.

EP1411007 discloses a flexible intermediate bulk container made of coated or uncoated woven fabric or plastic film, having antistatic properties, which is equipped with elements, which are enabled for corona discharge of static electricity accumulating in said container and having an outer surface.

WO2012/041482 in the name of both present applicants relates to the use of a tape for making flexible intermediate bulk containers, wherein the tape comprises (i) from about 75 wt. % to about 99.9 wt. % of a thermoplastic polyester, (ii) from about 0.1 wt. % to about 25 wt. % of a linear low-density polyethylene and (iii) from 0 wt. % to about 5 wt. % of other components, wherein the tape has a thickness from 5 um to 300 um and a width from 0.5 mm to 7 mm. The thermoplastic polyester is a poly(ethylene terephthalate) homopolymer or copolymer. No specific FIBC construction features needed for safe use of this PET-based FIBC have been disclosed in this document.

WO2013/087200 in the name of both present applicants relates to use of a fabric woven from a unidirectionally-oriented film in flexible intermediate bulk containers, comprising a composition consisting of a thermoplastic polyester (a) in an amount of 85 to 99.9 wt. %, based on the total composition; a polycarbonate (b) in an amount of 0.1 to 15 wt. %, based on the total composition; and an additive (c) in an amount of 0 to 10 wt. %, based on the total composition. The thermoplastic polyester is polyethylene terephthalate, especially a polyethylene terephthalate homopolymer. No specific FIBC construction features needed for safe use of this PET-based FIBC have been disclosed in this document.

JP2001234447 relates to a FIBC using a woven fabric made of a flat yarn of a recycled polyethylene terephthalate. The flat yarn woven fabric is made of a recycled polyethylene terephthalate having a strength ≥150 kgf/5 cm tensile strength and can be produced by weaving a flat yarn formed from a resin composition comprising a recycled polyethylene terephthalate resin having an intrinsic viscosity [IV] of 0.5-1.5 dL/g and a polyolefin-based resin and 1 to 10 wt. % of an inorganic filler, i.e. calcium carbonate. JP2001234447A does not disclose higher stacking stability and the potential to use PET FIBC for materials that are prone to internal movement. JP2001234447A does not disclose whether the PET FIBC could pass safety tests like the cyclic top lift test.

GB 2 224 006 A relates to a hybrid PET-PP FIBC but provides no indication that such a hybrid construction gives higher stacking stability and bulge resistance, let alone that the seam attaching the bottom to the sidewall needs to be modified to pass the cyclic top lift test.

U.S. Pat. No. 4,664,957 uses a 25% PET-PP tape to make FIBC wherein the PET is in the form of microfibrils, thus the tape is a 25% PET-PP microfibrillar composite. This document does not recite the stacking stability and bulge resistance of 25% PET-PP FIBC.

GB 7941902 relates to lifting loops made of nylon webbings, and these are stiffened by including a strip, wire or rod of resilient material. Stiffening elements can be for example polyethylene, polypropylene and nylon.

U.S. Pat. No. 4,493,109 is about a PP FIBC with integral lifting loops (non-sewn) arising from the body in wherein reinforcing bands are placed across the faces of 4 panel FIBCs, which become handles.

U.S. Pat. No. 4,207,937 discloses handle loops made of PET multi-filament fabric. U.S. Pat. No. 4,207,937 relates to strengthening the regions near seams where lifting loops are attached.

The commercial FIBCs currently available are made from polypropylene (PP) woven tape fabric, as discussed above. These FIBCs have limitations on stackability, particularly when the materials with low inter-particle friction, or incompressible and non-coalescing particles are filled. The PP FIBCs also have tendency to bulge and not fit into sea containers. The chemical and petrochemical industries produce a large amount of products in solid form. These solids may be fine powders with regular or irregular shaped particles (sub-mm or micron sized), such as purified terephthalic powder; or regular pellets, which are up to about 5 mm in size, such as polymer chips. Further, the mineral and mining industries produce solid products which may be in fine or coarse powder form, or even in rock form. The products of the petrochemical industry are currently sold in 25 kg bags, or in Flexible Intermediate Bulk Containers (FIBCs) which can carry 0.7 to 2.0 MT, or they can be carried in tanker lorries to sites that have installed storage silos.

The Flexible Intermediate Bulk Container (FIBC) in particular is a convenient storage form, because of its intermediate size. Not all manufacturers of industrial solid chemicals, plastic pellets and minerals sell their materials in tankers. Nor do all the end users of these materials have storage silos. Silo storage entails a risk in that if a portion of the product is contaminated, the material in the whole silo has to be downgraded or discarded. FIBCs are ideal for transport of solid materials to intermediate size businesses. If contamination is present, only a few bags might need to be isolated.

Flexible Intermediate Bulk Containers (FIBC) are essentially large sacks for storage and transport of solid materials which may range from powders to granules (pellets) to rock-like materials. As the FIBC is made from a woven textile, it has a flexible character. This allows empty FIBCs to be flattened into a bundle and then transported to a production factory, where it can be inflated with air to occupy its volume and then filled.

Commercial FIBC manufacture consists of the assembly of various parts of PP or PE woven tape fabric. Simple FIBCs are made from a tubular piece of fabric woven in a circular loom. Therefore a piece of the tubular fabric is cut to a length of about 100-200 cm; this forms the side wall. This piece would be pre-printed with the product name and company logos. Four handle loops (usually of PP tape fabric; sometimes of PET multi filament fabric) are attached to the side wall; each handle has two attachment 'legs' that are sewn to the side wall. The bottom and top panels may be made either of square fabric pieces or circular pieces of PP tape fabric, about 110 cm in diameter, cut from a wider piece (note not all FIBCS have top panels). The top and bottom panels may have central holes cut out for attaching the filling and emptying spouts. These pieces of fabric (the side wall, the top and bottom panels) are then joined together by stitching. The seams of PP FIBCs are stitched with PP or PET thread, most commonly using an overlock stitch or double-row double chain stitch. With other types of FIBCs, there may be more panels of PP woven tape fabric. For example, the four panel FIBC has a square cross section and four flat panels. These panels have to be joined together by stitching vertical seams; then the top and bottom panels are attached by stitching. The U panel FIBC is another common type. The U-panel is a construction consisting of an integral piece of fabric which forms two of the side walls that face each other and the bottom (the U-panel), and two opposing, separate side panels which have to be sewn to the two sidewalls and the bottom of the integral U panel. The present invention relates to the aforementioned types of FIBCs.

The present inventors found that in FIBCs the seam is a weak point of rupture. Hence, the FIBCs must pass a number of critical tests, the most crucial one being the cyclic top lift test. This cyclic top lift test simulates a filled FIBC containing the load (for example 1 or 1.5 MT) being lifted by a forklift by the 4 loop handles and driven across rough terrain. This imposes extra forces on the bag that might cause it to rupture. The test consists of (1) lifting the filled FIBC by the 4 loops by hooks and suspending it in mid air (2) loading the suspended bag with 3 MT force by a ram with a flat disk of about 0.75 in diameter which is driven down till it is in contact with the filled material at the top of the bag (2) then the applied force is removed (3) the previous cycle of loading with 3 MT and unloading takes 20 seconds and is repeated a total of 30 times (4) after which the ram is driven down till the bag is ruptured and the rupturing load is recorded. If the filled weight is 1 MT, the standard specifies that for a pass, the load at rupture must be at least 5:1, that is 5 MT. This is considered a safety margin of 5× for the filled load. Or put another way, FIBC manufacturers specify a safe working load for the sack (which is ⅕th the rupture load in the cyclic top lift test).

The FIBC design governs filling options. These include Open Top; Duffle Top; Conical Top; and Spout Top. FIBCs may also have different options for discharge of the contents. These include flat bottom, duffle bottom, conical bottom and spout bottom. FIBC options include coated, uncoated, ventilated fabric, and sift-proof seams. FIBC handling attachments can include 4 point lifting handles or loops (standard); single point lift and Cross Corner Loops.

It is found that especially when powders and pellets with low inter-particle friction, or incompressible and non-coalescing particles, are stored in PP FIBCs and stacked, there is a lack of stacking stability. The filled PP FIBC distorts (distends symmetrically or asymmetrically) during transport and storage due to movement of the material inside and above. If the distension is asymmetric, the effect is that centre of gravity will shift accordingly and the stacked FIBCs can fall down and cause injury or spillage.

In practice FIBCs are filled and subsequently placed, and most often stacked, in a warehouse. Warehouse space limitations are encountered almost everywhere. The stacking height depends on the toppling stability. This depends on, inter alia, the particle size (bulk density), the inter-particle friction and the compressibility of the product inside the PP FIBCs. Products with high inter-particle friction or with high coalescing tendency, such as sugar and purified therephthalic acid, can be filled in conventional PP FIBCs and even treble stacked without toppling problems. The stacking stability of PP FIBCs is particularly poor with particulate materials having low inter-particle friction, such as beads of expandable polystyrene (EPS), and with particulate materials having low compressibility, such as polymer pellets. Both type of particulate materials have a tendency to move sideways, i.e. out of the centre. As mentioned before, any asymmetric internal displacement of the contents would cause toppling. Thus, the stacking stability of the FIBC needs to be improved.

Another aspect of hard, incompressible materials, such as PET chips, when stored in conventional PP FIBCs, is that these materials will cause bulging of the side walls. The bags bulge after filling and during storage, due to the outward pressure exerted by the hard, incompressible chips, and when stacked, this bulging of the lowest bag increases with time, and this is enhanced during hot weather. The bulging increases the width footprint of the bag. This leads to problems in loading sea containers. Normally, the sea container is a little over twice the width of a conventional PP FIBC. However, after the PP FIBC is filled with PET chips for instance, the bulging after stacking makes it difficult for the second FIBC to be pushed into the sea container; and likewise, unloading of the bags becomes difficult.

An aspect or feature of the present invention is to provide FIBCs that can be stacked higher than conventional FIBCs.

Another aspect or feature of the present invention is to provide FIBCs that easy fit in and discharge from sea containers, Another aspect or feature of the present invention is to provide FIBCs that facilitate the lifting of the FIBCs by forklifts.

Another aspect or feature of the present invention is to provide FIBCs that can be secured in transport against damage from movement.

Another aspect or feature of the present invention is to provide FIBCs that meet the international requirement of breakage strength, for example that is more than 5× the filling load (of 0.7 to 2 MT), so that filled FIBCs can be transported safely from the filling site to another place by the lifting handles, for example to a warehouse.

Another aspect or feature of the present invention is to provide FIBCs that can be used for packaging powdery materials that have a tendency for internal movement after filling in the FIBCs.

The present invention thus relates to a Flexible Intermediate Bulk Container (FIBC) having a body made of flexible fabric woven from polymeric tapes, and transport loops, wherein the body comprises side walls, bottom and top parts, characterised in that the fabric of at least one of the side walls and transport loops is woven from uniaxially-drawn PET tape having a density greater than 1.333 g/cm$^3$.

Such a Flexible Intermediate Bulk Container (FIBC) fulfils one or more of the above mentioned aspects. The term "side walls" as mentioned here covers the three types of FIBCs as mentioned before, i.e. the cylindrical wall type, U panel type and four panel type. More in detail, the present invention relates to a Flexible Intermediate Bulk Container (FIBC), wherein the FIBC is a FIBC type chosen from the group of cylindrical type, i.e. a tubular side wall with circular top and bottom panels, tubular type, i.e. cylindrical side wall and non-circular top and bottom panels, and a U panel type. i.e. a single fabric piece forming two opposing sidewalls and the bottom, and two separate flat panels forming the remaining opposing sidewalls.

According to an embodiment of the present flexible Intermediate Bulk Container (FIBC) at least one of the fabrics of the bottom parts, top parts and transport loops is woven from at least one of the group of uniaxially-drawn (polypropylene) PP tape and uniaxially-drawn (polyethylene) PE tape.

According to another embodiment of the present invention the fabric of the bottom and top parts is woven from uniaxially-drawn PET tape having a density greater than 1.333 g/cm$^3$.

In a Flexible Intermediate Bulk Container (FIBC) according to the present invention the fabric of the transport loops is preferably woven from uniaxially-drawn PET tape having a density greater than 1.333 g/cm$^3$.

According to another embodiment the fabric of the transport loops of a Flexible Intermediate Bulk Container (FIBC) of the present invention is preferably made from a combination of at least one member chosen from the group of uniaxially-drawn PET tape having a density greater than 1.333 g/cm$^3$ and PP tape and at least one member chosen from the group of PP multifilament yarn and PET multifilament yarn.

When manufacturing a Flexible Intermediate Bulk Container (FIBC) of only PET, it is preferred that the fabric of the side walls, bottom and top parts and transport loops is woven from uniaxially-drawn PET tape having a density greater than 1.37 g/cm$^3$, and preferably greater than 1.39 g/cm$^3$.

In the present Flexible Intermediate Bulk Container (FIBC) it is preferred that the tape used to make the fabric is manufactured from a homoPET, or a co-PET containing comonomers up to 20% by weight, such as isophthalic acid.

The tape used to make the fabric may contain one or more additives, chosen from the group of polymeric type compounds, anti-block additives, anti-slip additives, anti-splitting additives, colorants and UV stabilisers, wherein the total amount of the additives <15 wt. %, based on the total weight of the tape. Preferred embodiments of the polymeric type compounds are chosen from the group of polyethylenes (HDPE, LLDPE, LDPE), polycarbonate, polypropylene and poly(ether ester) copolymers, or combinations thereof. In addition, examples of anti-block additives include inorganic or minerals like $TiO_2$, barium sulphate, silica and calcium carbonate. It is preferred that the uniaxially drawn PET tape is free from voids and/or is not a microporous tape, such as the tapes disclosed in WO2009/130032.

In a Flexible Intermediate Bulk Container (FIBC) according to the present invention the fabric comprises woven warp tape and weft tape, the warp tape preferably has a width in the range of about 1-10 mm, more preferably 1-3 mm and preferably a thickness in the range of about 10-100 microns, more preferably 60 to 100 microns, the weft tape having preferably a width in the range of 1-10 mm, more preferably 3-5 mm and preferably a thickness in the range of 10-100 microns, more preferably 20-40 microns.

One or more of the above mentioned aspects or feature were achieved with PET FIBCs with PET handles. Surprisingly, it was found that FIBCs made from PET tape fabric could be stacked to higher levels than PP FIBCs. This allows a better utilisation of the space of a warehouse. In addition the present FIBCs bulge less compared with PP FIBCs, even in the hottest weather, hence they can be fitted and removed from sea containers with ease.

According to the present invention PET FIBCs are preferably made from uniaxially-drawn PET tape with a density greater than 1.33 g/cm$^3$. The fabric woven from the PET tape can be converted to FIBCs by suitable tailoring. The tape fabric used to make the FIBCs with increased stacking stability and stable dimensional footprint (resistance to girth expansion) should be made with PET, which may have optional additives (polymeric and/or mineral) up to a maximum of 15% by weight. The PET has an intrinsic viscosity [IV] greater than 0.55 dL/g and preferably is over 0.80 dL/g. The tape could be made from recycled PET (RPET), or a mixture of virgin and RPET, including one or more additives, as mentioned before.

In another embodiment of the invention, hybrid PET-PP FIBCs may be used for stacking. Hybrid FIBCs as defined here have side walls made of PET tape fabric, and the top and bottom panels are made from polyolefin tape fabric. The parts may be sewn together with sewing thread. As the side wall is the key to resisting internal movements of the contents, it is only necessary to make the sidewall(s) of PET tape fabric. Such a hybrid PET-PP FIBC would help with cost reduction, however, for recycling purposes an all-PET FIBC might be preferred.

The purpose of the invention is to increase stacking stability and reduced bulging tendency, and allow FIBCs to be used for products with low inter-particle friction, which was not hitherto possible with conventional PP FIBC. The inventors have discovered that the key to achieving the increased stacking stability and reduced bulging tendency is to have the sidewall (if a cylindrical FIBC), or the side panels in a four panel FIBC, made of PET tape fabric. The top and bottom fabric are not critical for stacking stability and bulging tendency and so can be made out of PP or PET.

Most importantly, whether an all-PET FIBC, or the hybrid PET-PP FIBC, is used, these must pass critical safety tests, in particular the cyclic top lift test with a safety factor of at least 5:1, otherwise the FIBC cannot be used.

Thus, the present application relates to a Flexible Intermediate Bulk Container (FIBC) that passes the cyclic top lift test at a safety factor of 5:1 or higher with a fill load of over 0.5 MT, preferably over 1 MT and most preferably over 1.5 MT.

The PET FIBCs and the hybrid PET-PP FIBCs manufactured according to the conventional methods of sewing the seam failed the cyclic top lift test (according to BS EN ISO 21898:2005) for a load of 1.5 MT. This is a critical safety test and for a batch of 10 PET FIBCs and 10 PET-PP hybrid FIBCs, all bags failed prematurely (that is at a load less than 5× the safety factor for a load of 1.5 MT) at the seam joining the bottom to the side wall.

According to a preferred embodiment the edges from the side walls and bottom parts of the FIBCs are first folded once or twice and fixed together by sewing, wherein the side walls and bottom parts thus constructed are connected by sewing. This method of assembling the PET FIBC is preferred, especially with regard to the cyclic top load test with a safety factor of at least 5:1 for a fill load of at least 1.5 MT.

It is preferred that the aforementioned way of fixing of edge folds and fixing together of the side walls, and bottom parts is carried out by a single row or double row stitch, more preferably double lock stitching and/or double chain stitching.

For PET FIBCs, the fabric for the sidewall and the bottom had to be prepared by folding the edges and fixing this fold by sewing it (double lock stitch, or double chain stitch). Afterwards the sidewall and bottom had to be connected with a single row double chain stitch, in order for this seam not to fail prematurely in the cyclic top lift test. In the present invention a single row, double chain-stitch is used for the joining of the sidewall to the bottom, which is different from the stitching method used in U.S. Pat. No. 8,360,642, i.e. a double row stitch to connect the side wall or coat with the bottom.

The present invention also relates to a method for attaching a circular unloading spout to the PET FIBC. This region was secured by a PET spout where the attaching edge of the spout was double folded and then stitched to the bottom fabric with a double row, double chain-stitch, to prevent premature failure of this region in the cyclic top lift test. In a preferred embodiment of the present Flexible Intermediate Bulk Container (FIBC) the bottom part is optionally provided with a circular spout attachment, wherein the edge of the circular bottom opening is double folded and the attaching edge of the spout is stitched to the bottom part, preferably with a double row, double chain-stitch.

According to such a method the PET FIBC with the bottom unloading spout option, could pass the cyclic top lift test, while maintaining the benefits of higher stacking stability and lower girth expansion compared with a PP FIBC.

Conventional PP transport loops are woven from PP tapes, PP multifilament or a combination of both. These are not stiff enough to stand proud of the container. The transport loops are used to handle the FIBCs with a fork lift truck by passing the tines (the blades of the fork lift) through the lifting loops. The use of PP loops has the disadvantage that the loops have little or no resilience and therefore somebody is needed to hold up the loops while the tines of the fork lifting truck are manoeuvred through the loops by the fork lift truck driver. With the triple-stacked PET FIBCs having PP handles in particular, it was very difficult for the fork lift driver to find the loops of the top most bags; this is faced when bringing the bag down.

According to the present invention the problem of drooping loops can be solved by the use of loops which are woven from PET tapes or a combination of PET tapes and PET multifilament. PET loops are more resilient and can stand proud of the container and offer access to lifting means. Moreover they have sufficient resilience to return to the upright position after being pressed flat by the stacking of the FIBCs. The transport loops can be woven from PET tapes or a combination of PET tapes and PET multifilament. The tapes can be fibrillated or profiled.

Another advantage of PET loops, is that the stiffness of the side walls can be further enhanced, especially if the transport loops are extended to the bottom of the FIBC and are sewn to the side wall from bottom to top. The present transport loops preferably extend to the bottom of the FIBC and are sewn to the side wall from bottom to top, preferably the transport loops are sewn to the corners of the side walls.

Another embodiment would be that the transport loops are sewn to the corners of the side walls. If PET sewing yarn is used the FIBC is made of PET only and would be fully recyclable, as a further advantage.

In summary, the present invention relates to FIBC that provides higher stackability, and bulge resistance. In a preferred embodiment such a FIBC is made of woven PET tapes. Further the invention teaches how to manufacture a PET FIBC so that it passes the safety test (cyclic top lift test) without failure at various seams. The present invention also discloses an improved FIBC handle made of PET tape and multifilament fabric that stands proud and allows ease of lifting down of the top bag from a multi stack.

EXPERIMENTAL

The control experiments were done with standard PP FIBCs. The specifications of the PP FIBC, the PP tape used to make it, the PP fabric and the handles are given below:

Conventional PP FIBC Type, for Control Experiment

This had a tubular body, with top and bottom panels, all of PP woven tape fabric. The FIBC height was 130 cm. The dimensions of the fabric are 105×105, the dimensions of the bottom panel (square piece of fabric) are 95 cm×95 cm.

PP FIBC Tape Specification:

Tape width: 2.0 mm in warp direction & 4.0 mm in weft direction.

Warp tape: 2.0 mm=1,900 Denier (g/9000 m)

Weft tape: 4.0 mm=1,700 Denier (g/9000 m)

Strength of Tapes:

Warp 2.0 mm 1,900 Denier=10 kgf & tenacity—5.25 g/denier

Weft 4.0 mm 1,700 Denier=8.9 kgf & tenacity—5.25 g/denier

Elongation of tapes is between 20-25%.

PP FIBC Tape Fabric Specification:

Weight of fabric: 200 g/m$^2$.

Mesh: Warp—12.8×Weft—12.6 (no of tapes per inch).

PP FIBC Fabric Tensile Strength:

Warp—192.74 kgf/5 cm

Weft—193.42 kgf/5 cm.

Elongation to Failure of PP FIBC Fabric:

Warp—22%.

Weft—26%.

PP Handle Strap Construction

The FIBCs had four handles sewn, so that they could be lifted by a fork lift. The following are the specifications for the handle straps.

Weight per meter=60 g, Width—8 cm, weight per unit area –750 g/m$^2$.

Warp direction: PP tape, 2.0 mm width, 2,000 Denier, Thickness—122 microns or 4.0 mm width, 2,000 Denier, Thickness—62 microns, Strength—10.5 kgf, tenacity—5.25 g/denier.

Weft Direction: PP Multifilament 900 Denier, Strength—5.4 kgf, tenacity—6 g/denier.

The straps were sewn to the body of the PP FIBC by using 1,800 Denier twisted multi-filaments.

Assembly of the Control PP FIBC, and Sewing Method

The fabric parts for the FIBC (consisting of sidewall, top and bottom panels and handles) were connected together with the conventional sewing style used in commercial production. Body, top, bottom, filling and unloading spout parts were cut from a roll of PP woven tape fabric with the above specification, into required sizes. The tying string was attached to the spouts. A hole was cut in the top panel and then the filling spout was attached by sewing. Next the bottom panel was prepared and the unloading spout was sewn. The 4 handle loops were next sewn to the sidewall. After this, the top panel was attached to the sidewall by an overlock stitch and then the bottom panel was attached to the sidewall also by an overlock stitch.

PET Tape Specification for PET FIBC

The tape was made using SABIC's PET, grade HC-100. As disclosed in WO 2013/087200 A1, 2% polycarbonate (SABIC Innovative Plastics grade Lexan PK 2870) and 5% LLDPE (SABIC grade 6318 BE) were added as processing aids. However, the nature of the processing aids is not important for the FIBC; alternative additives such as those mentioned in WO 2012/041482 A1 can also be used, and indeed PET tapes with no additives could also be conceivably used to make FIBC with the benefits shown here.

Warp tape: 2.0 mm=1,800 Denier (g/9000 m) thickness—75 microns.

Weft tape: 4.0 mm=1,600 Denier (g/9000 m), thickness—33 microns.

Strength of Tapes:

Warp 2.0 mm 1,800 Denier=10 kgf & tenacity—6.9-7.0 g/denier

Weft 4.0 mm 1,600 Denier=8.9 kgf & tenacity—7.3 g/denier

Elongation of tapes is between 10% warp and 11% weft %.

PET FIBC Tape Fabric Specification:
Weight of fabric: 190 g/m$^2$.
Mesh: Warp—12.7×Weft—12.6 (no of tapes per inch).
PET FIBC Tape Fabric Strength:
Warp—220 kgf/5 cm
Weft—235 kgf/5 cm
Elongation-to-Failure of PET FIBC Tape Fabric
Warp—9%
Weft—10%
Straps (Loop) Strength: Single—950 kgf & Double—1,900 kgf.

The same PP straps were used as for the PP FIBC (see above) initially.

PET FIBC Assembly, Employing the Method Used for Conventional PP FIBC

The PET FIBC had the same dimensions and construction style as the control PP FIBC. It had a tubular body, with square top and bottom panels, all of PET woven tape fabric. The height was 130 cm, the bottom panel was a square piece of fabric and was 95 cm×95 cm. The top panel had a central hole with a filling spout attachment sewn. The bottom panel had a central hole with an unloading spout attachment that was sewn.

Fabric for Sidewall of FIBC:
Width—190 cm double flat (95 cm×95 cm side length for square base FIBCs) tubular with Reinforcement area for loop stitching; height 130 cm
Areal weight of fabric—190 g/m$^2$.
Fabric for Bottom Panel of PET FIBC:
Width—105 cm flat with ultrasonic cutting to avoid tape removal. Unloading spout (36 cm diameter×46 cm length) was sewn to the bottom in the conventional way. Areal weight—190 g/m$^2$.
Fabric for top panel: Use sidewall fabric, with a spout for filling.

The seams for joining the sidewall, the bottom and top were stitched with overlock stitch, as done with conventional PP FIBCs, made from tubular fabric.

PET-PP Hybrid FIBC, with Conventional Assembly as Done for PP FIBC

The FIBC had a tubular side wall made of PET tape fabric and square top and bottom panels made of PP tape fabric. The FIBC dimensions and style were the same as the above for the control PP FIBC and the all-PET FIBC. The top and bottom panels of PP fabric were attached to the sidewall of PET tape fabric by stitching using the conventional stitching style used for the control PP FIBC. The seams for joining the sidewall, the bottom and top were stitched with an over lock stitch. The top panel had a central hole with a filling spout attachment; both were of PP tape fabric. The bottom panel had a central hole with an unloading spout attachment that was sewn, and both were of PP tape fabric.

Fabric for sidewall of FIBC: PET tape fabric.
Areal weight of fabric—190 g/m$^2$
Width—190 cm double flat (=95 cm×95 cm side length for square base FIBCs), tubular with reinforcement area for loop stitching; height 130 cm.

Fabric for top panel and filling spout: PP woven tape fabric, areal weight 200 g/m$^2$ Fabric for bottom panel with unloading spout: PP woven tape fabric, areal weight 200 g/m$^2$. Width—105 cm flat. Unloading spout (36 cm diameter×46 cm length) was sewn to the bottom in the conventional way used for PP FIBC.

PET FIBC Using Novel Technique for Joining

The all-PET FIBC was the same as described above, except the seams joining the bottom panel to the sidewall were constructed as follows. First the bottom panel with the unloading spout was prepared as follows. The unloading spout of PET fabric was fixed to the bottom panel in a different way than that normally used for standard PP FIBCs. The attaching edge of the spout was double folded and then stitched to the bottom fabric with a double row, double chain-stitch, to prevent premature failure in the cyclic top lift test. Next, the bottom panel was attached to the side wall as follows. The edges from the FIBCs side wall and bottom panel were folded once or twice and fixed together first by sewing using a double lock stitch, or double chain stitch. After securing this, the side wall and bottom panel were connected by sewing with a single row of double chain stitch, in order for this seam not to fail prematurely in the cyclic top lift test, by the tapes pulling out. Without these innovations, the seam joining the bottom panel to the sidewall is prone to premature failing in the cyclic top lift test. The top panel made of PET tape fabric may be attached to the all-PET FIBC in the way as used for PP FIBC as it does not fail during the cyclic top lift test.

PET-PP Hybrid FIBC, Using Novel Assembly Technique for Joining

As the bottom panel and unloading spout are both of PP tape fabric, they can be sewn as normally done for all-PP FIBCs. However, the bottom panel (of PP tape fabric) had to be attached to the side wall (of PET tape fabric) as follows. The edges from the PET side wall and the PP bottom panel were folded once or twice and fixed together first by sewing using a double lock stitch, or double chain stitch. After securing these, the PET side wall and PP bottom panel (with the PP spout) were connected by sewing with a single row of double chain stitch, in order for this seam not to fail prematurely in the cyclic top lift test, by the tapes pulling out. Without this, the seam joining the bottom panel to the sidewall would fail in the cyclic top lift test.

The Cyclic Top Lift Test (According to Standard BS EN ISO 21898:2005)

This cyclic top lift test simulates a filled FIBC containing the load (for example 1 or 1.5 MT) being lifted by a forklift by the 4 loop handles and driven across rough terrain. This imposes extra forces on the bag that might cause it to rupture. The test consists of (1) lifting the filled FIBC by the 4 loops by hooks and suspending it in mid air (2) loading the suspended bag with 3 MT force by a ram with a flat disk of about 0.75 in diameter which is driven down till it is in contact with the filled material at the top of the bag (2) then the applied force is removed (3) the previous cycle of loading with 3 MT and unloading takes 20 seconds and is repeated a total of 30 times (4) after which the ram is driven down till the bag is ruptured and the rupturing load is recorded. If the filled weight is 1 MT, the standard specifies that for a pass, the load at rupture must be at least 5:1, that is 5 MT. This is considered a safety margin of 5×. Even though the stackability tests were conducted with 950-1000 kgs. of filled material, the PET FIBC with the present joining procedure was tested with a filled load of 1.5 MT for the cyclic top lift test.

DISCUSSION OF EXAMPLES

Examples 1-3 describe the stability of PET FIBCs filled with materials that are difficult to stack in PET FIBCs. In these examples, the PET FIBC was assembled in the same way as conventional PP FIBCs, in particular the same method of stitching the seams was employed (over lock stitch). The most common stitching styles used for PP FIBCs are overlock stitch or double-row double chain stitch. Example 4 describes the stacking capability of PET-PP hybrid FIBCs, also stitched with the same method as used for the conventional PP FIBC.

Example 1 is about 950 kgs. of expandable polystyrene (EPS) beads filled in PET FIBCs having a polyolefin inner liner. These could be double-stacked and could stand stably for 6 months during the hottest weather (35 deg. C. in the warehouse), unlike the PP FIBC filled with the same amount of EPS beads, which fell down within a couple of hours. EPS beads are therefore sold in cardboard octabins which are about 4 times the price of an FIBC. The commercially available PP FIBC is economically attractive but is simply not technically capable (unable to double stack with EPS beads). 1.1 MT of PET chips (made in SABIC's plant 'Ibn Rushd') are packaged in a polyolefin liner placed in a PP FIBC. The plant double-stacks the PP FIBCs filled with 1.1 MT of PET chips. Double stacking in PP FIBCs is quite safe as the PET chips are not slippery like the EPS beads. But the double-stacked PP FIBCs with PET chips expands in girth with time, especially during hot weather. The PP FIBC does not have dimensional stability as its girth is higher during hotter weather. Due to de-bottle necking and expanded production in the plant, there was a storage problem with the extra bags. These had to be placed outside in the sun but this led to weather related contaminations. Hence, the 'Ibn Rushd' warehouse wished to stack three bags high. However, it was repeatedly found that PP FIBCs with PET chips when triple stacked were prone to toppling and hence were unsafe.

Example 2 solves the problem above with a FIBC according to the present invention which is made of woven PET tape fabric. While PP FIBCs with 1.1 MT of PET chips could be double stacked but not be safely triple-stacked, PET FIBCs could be triple stacked with 1.1 MT of PET chips, over a test period of 6 months. The tests were done with one triple stack inside the warehouse and another triple stack outside in the sun. The test was started on 27 Jun. 2013 (peak summer) and continued till 27 Dec. 2013. The peak temperature in the warehouse was 35 deg. C. and that outside was 45-50° C.

Many polyolefin producers make LLDPE grades with a slip additive, which is typically euracamide. However, the presence of such an additive makes the LLDPE chips 'slippery'. SABIC's plants have found such a slippery LLDPE grade cannot be stored in PP FIBCs and double stacked, as the top bags tilt and fall down within 24 hours. Hence, such grades are sold in 25 kgs bags.

Example 3 shows that the slippery LLDPE grade can be packaged in a PET FIBC and double-stacked safely.

Example 4 shows an equivalent result in terms of stacking stability is obtained if the fully-PET FIBC is replaced with a hybrid PET-PP FIBC. In this hybrid FIBC, only the side wall is made of PET tape fabric. Either the top and bottom can be made of PP tape fabric; or one can be made of PET and the other of PP tape fabric. PET FIBCs have higher stacking stability than PP FIBCs and this solves the problem of restricted use of warehouse height. Even hybrid PET-PP FIBCs (sidewall of PET; bottom and top of PP) show similar stacking stability as the all-PET FIBC.

While examples 1-4 prove that the PET FIBCs and even the hybrid PET-PP FIBCs have unexpected superior stacking-stability and therefore they would solve the problem of economic utilisation of warehouse space, it was found that all the bags of examples 1-4 unfortunately failed the cyclic top lift test; that is, the bags could not attain a safety factor of 5× the filled load (see comparative Example 5). In contrast, the control PP FIBCs with 1.1 MT load passed the test comfortably reaching loads at rupture between 5.7 and 6.3 MT. Without passing this safety test, the PET FIBCs and the PET-PP hybrid FIBCs with the valuable properties of enhanced stackability and bulge resistance cannot be sold.

It was noticed that the premature failure of the PET FIBC and the PET-PP hybrid FIBC during the cyclic top lift test always started by rupture at the seam joining the bottom panel to the side wall, at a force value less than the requirement of 5× the filled load. Stronger sewing threads were tried but it was to no avail. An effort to solve the premature seam failure by switching from the conventional overlock stitch used with PP FIBCs to a seam with double-row chain stitch was not successful (see Comparative Example 6). While the failure in the cyclic top lift test does not affect the stacking stability of the PET FIBCs, it means it is unsafe to shift the FIBC by hanging it by the loops on a fork lift truck from the production and filling site to the warehouse. If the safety factor for lifting by the loops and driving the forklift is not met, then the FIBCs can only be shifted, lifted and brought down by placing them over pallets; the forklift picks up the pallet through slots. An FIBC that does not meet the international requirement of at least 5× the filling load for breakage cannot be sold.

It was thus clear that the PET FIBC cannot be engineered and assembled like a PP FIBC of the prior art. The solution the inventors found was to search for alternative stitching styles for preventing the premature seam failure. Once the seam failure (between sidewall and bottom panel) was solved, the failure shifted to the region where the loop handles were sewn to the sidewall, and when that was solved, the spout region needed to be re-designed. The modifications made to make a FIBC from PET tapes that could pass the safety test is described in Example 7. After these modifications, the PET FIBC could pass the cyclic top load test with a safety factor over 5:1, and hence its potential for solving the storage space problems in warehouses (higher stackability) could be realised.

Investigation of the premature failure showed (Comparative Example 6) that the failure zone was always the seam joining the coat to the bottom. The type of failure was the same whether an all PET FIBC or a hybrid PET-PP FIBC was used. Different sewing threads were tried. A different stitching style was tried but it did not work (see comparative Example 6).

Example 7 describes the inventive modification needed in the construction of FIBCs made with PET tape fabric so that premature failure does not occur in the cyclic top lift test as follows. In the embodiment of example 7 the side wall and bottom parts were folded once and fixed by sewing using a double chain stitch. After preparing the edges of the fabric by folding and fixing, the bottom was sewn to the sidewall; whereas the raw edges should be on the outside of the container, to prevent contamination with loose tapes inside the container (see Example 7). The performance of other options such as the discharge spout had to be checked. For example, here a circular unloading spout option was considered for the FIBC made from PET tapes. This showed that modification was needed here also (compared with the method used for attaching this spout in a conventional PP FIBC) as otherwise the attachment point of the discharge spout became a source of premature failure in the cyclic top lift safety test. Basically the edges of the fabric of the spout had to be prepared by folding the edges and fixing them by sewing, before the spout could be connected to the bottom panel also by sewing (see Example 7).

Although the examples used FIBCs from tubular fabric, a similar approach can be taken with four panel FIBCs. Four panel FIBCs have four flat sidewall panels and a top and bottom panel. Such an FIBC has a square cross section. Whereas the FIBC from tubular fabric has no vertical seams, the four panel FIBC would have vertical seams also to join the corners. With PET tapes, these could also fail prematurely. These then can be sewn after folding the edges Example 1

PET FIBC Sewn with Conventional Overlock Stitch with 950 kgs. of EPS Beads

The example shows that materials with low inter particle friction, generally sold in expensive cardboard octabins, can be packaged and double-stacked in cheaper PET FIBCs. PET and PP FIBCs were stitched from tubular tape fabric woven from the corresponding tapes in a Starlinger circular loom. The dimensions of the PET FIBC and the control PP FIBC are given in the experimental. The sidewall, bottom and top of the PET FIBC were made of the specified PET tape fabric. The seams of both types of FIBC were sewn with the conventional overlock stitch used for PP FIBCs. 950 kgs. of expandable polystyrene (EPS) beads (SABIC's EPS grade 452) were placed in ten PET FIBCs and four control PP FIBCs (all with polyolefin inner liners). The EPS beads were near spherical with diameter in the range of 0.4-0.8 mm; they were smooth, and hence had low inter-particle friction.

Five sets of double-stacked FIBCs from the PET tape fabric (filled with EPC beads) were made. Double stack means one FIBC at ground level and the second on top of it. For the control experiment, two sets of double-stacked FIBCs from the PP tape fabric (filled with EPC beads) were made.

In the control experiment, the double-stacked PP FIBCs filled with EPS beads tilted and fell down between 1-2 hours. However, the double-stacked PET FIBCs filled with EPS beads were standing upright even after 6 months, without any sign that the top bag would fall down.

Although the price of the FIBC was a quarter or a third of the cardboard octabins, it was not sufficient for acceptance. Double-stacking of the PET FIBC was essential to find acceptance, as there was not enough warehouse space to use FIBCs stored at ground level.

Unfortunately, this PET FIBC with the seam joining the bottom fabric with the sidewall when made with the conventional overlock stitch used for PP FIBC failed at the seam in the cyclic top lift test at a load of 4:1 instead of at least 5:1 (see Comparative Example 5). The failure was always at the seam joining the sidewall to the bottom.

Example 2

PET FIBC with Conventional Overlock Stitch with 1.1 MT of PET Chips

This example illustrates the superior (that is higher) stacking stability of the PET FIBC compared with the PP FIBC that is commercially in use, when filled with a material that does not have a particularly low inter-particle friction, but which is composed of hard, incompressible pellets. The seams were sewn with the conventional overlock stitch used for PP FIBCs. PP handles were used for the PET FIBC and the control PP FIBC.

Three PET FIBCs and three control PP FIBCs all having liner bags were filled with 1.1 MT of SABIC's PET bottle grade chips (grade BC-112, semi-crystalline chips, bulk density 0.82 g/cm$^3$). The PP and PET FIBCs filled with 1.1 MT of PET chips were triple stacked (ground level bag+two on top). One set of triple stacked PET and PP FIBCs were placed inside the warehouse. The trial started on 27 Jun. 2013 and ended on 27 Dec. 2013. At the end of the trial on 27 Dec. 2013 (6 months), the triple stack of the PET FIBCs was standing. The triple stacked PP FIBCs fell down within 24 hours of the start, which is on 28 Jun. 2013. The triple stacks of the PP FIBCs were erected three times, but they always fell down; double stacks of PP FIBCs with 1.1 MT of PET chips were stable.

A second set of triple stacked PET and PP FIBCs was placed outside in the sun for the same period, starting from 27 Jun. 2013 to December 2013. Result—The triple stacked PET FIBCs filled with 1.1 MT of PET chips were stable and did not show signs of tilt even after 6 months in the open (peak temperature in the summer reached 45-50° C.). The triple stacked PP FIBCs outside also fell down like the triple stack PP FIBCs with PET chips in the warehouse.

This example shows that the PET FIBC has higher stacking stability also for materials where the particles do not have low friction, but are hard and incompressible (like PET chips).

However, this PET FIBC with the bottom seam joined by the conventional overlock stitch used for PP FIBC failed at the seam in the cyclic top lift test at a load of 4:1 or lower instead of at least 5:1 (see Comparative Example 5). The failure was always at the seam joining the sidewall to the bottom panel. The PP FIBC of course passed the test with a safety factor >5:1.

Example 3

PET FIBC with Conventional Overlock Stitch, Filled with Slippery LLDPE Pellets

This example also proves the unexpected stacking stability of PET FIBCs compared with PP FIBC when slippery pellets are packaged. PET FIBCs were made from tubular PET tape fabric woven in a Starlinger circular loom. The seams were sewn with the conventional overlock stitch used for PP FIBCs.

Two PET FIBCs and two PP FIBCs were filled with 0.82 MT of a slip grade of linear low density polyethylene (LLDPE, SABIC's grade 118WJ) that had been placed in a liner bag. This LLDPE grade is for blown film and has a slip agent incorporated to give the film a low sliding friction. The LLDPE pellets thus have low inter-pellet friction. Such LLDPE pellets are generally sold in 25 kgs. bags.

When the control PP FIBCs with the slippery LLDPE pellets were double-stacked, the top bag tilted and was ready to topple after 24 h. On the other hand, double-stacked PET FIBCs with the same slippery LLDPE chips remained upright even after 6 months.

Unfortunately, this PET FIBC with the bottom seam joined to the sidewall by the conventional overlock stitch used for PP FIBC failed at this seam in the cyclic top lift test at a load of 4:1 instead of at least 5:1 (see Comparative Example 5). The failure was always at the seam joining the sidewall to the bottom.

Example 4

Hybrid PET-PP FIBCs with Conventional Overlock Stitch

In this example 4, the above mentioned examples 1-3 were repeated with hybrid PET-PP FIBCs, where the critical component for stacking stability and bulging resistance, that is, the side wall, was made with PET tape fabric, while the bottom and the top panels were made of PP tape fabric which were attached by sewing to the sidewall in the conventional manner with an overlock stitch. Conventional PP handles were attached.

Three PET FIBCs and three control PP FIBCs were filled with a liner bag containing 1.1 MT of SABIC's PET bottle grade chips (semi-crystalline chips, bulk density 0.82 g/cm$^3$). The PP and PET FIBCs filled with 1.1 MT of PET chips were then triple stacked (ground level bag+two on top). Both sets of bags were placed in a cordoned area in a warehouse and the girth of the bottom bag at half height was measured. The girth of the bottom bag (of the triple stack) at half height was measured at the start of the trial and was 389 cm for the PET-PP hybrid FIBC and was 404 cm for the PP FIBC. The warehouse temperature was 35° C. in June 2013.

The triple stacked hybrid PET-PP FIBCs bag filled with 1.1 MT of PET chips were stable and did not show signs of tilt even after 6 months in the warehouse. Compared with the PP FIBC, the bulge is lower for the PET hybrid FIBC. Further, the PET-PP hybrid FIBC had dimensional stability—after six months, the girth of the PET-PP hybrid FIBC in the warehouse was still 389 cm. For the PP FIBC, the girth of the bottom bag of a triple stack on the first day (before the bags fell down) was 404 cm. This shows the PP FIBC bulges more than the PET hybrid FIBC. The triple stacked PP FIBCs fell down before 24 hours, hence the girth after 6 months could not be measured. Another triple stack of PP FIBCs was made in December when the warehouse temperature was 20° C.; the circumference of the FIBC on the first day was 390 cm. This shows that the PP FIBC is temperature sensitive (circumference of 404 cm on the first day when done in June and 390 cm on the first day when done in December) whereas the PET FIBC is not as temperature sensitive.

The same experiments were repeated at the same time but outside in the sun. Three PET-PP FIBCs and three control PP FIBCs with liner bags were filled with 1.1 MT of SABIC's PET bottle grade chips. The PET-PP hybrid FIBCs and the control PP FIBCs filled with 1.1 MT of PET chips were triple stacked (ground level bag+two on top) and placed outside in the sun for 6 months (starting on 27 Jun. 2013).

The triple stacked hybrid PET-PP FIBCs bag filled with 1.1 MT of PET chips were stable and did not show signs of tilt even after 6 months. The girth or circumference at half height of the bottom bag of the PET hybrid FIBC triple stack was 389 cm on the first day. It was 390 cm after 6 months and the 1 cm increase was due to the higher temperature outside (compared with the warehouse). The triple stacked PP FIBC placed outside fell down, again confirming it was not stable.

Double stacks of PET-PP hybrid FIBCs with 1.1 MT of PET chips (stored for 6 months) outside and PP FIBCs with 1.1 MT of PET chips (stored outside for 1 week) were placed on a wooden pallet. The pallets were lifted and then loaded into a 20 foot sea container with a fork lift. The fork lift had difficulty fitting the double stack of the PP FIBCs. On the other hand, the pallet with the double stack of PET-PP hybrid FIBCs with 1.1 MT of PET chips stored for 6 months outside could be driven by the forklift into the 20 foot container and fitted more easily into the container.

As the same results were obtained with the hybrid PET-PP FIBCs as in examples 1-3, the resistance to toppling due to the internal movement of the contents arises from the PET fabric in the sidewall of the FIBC. The hybrid FIBCs like the all-PET FIBCs offer superior stacking stability and a stable dimensional footprint than PP FIBCs, even at high temperatures.

Such a hybrid PET-PP FIBC would reduce costs. Unfortunately, the hybrid PET-PP FIBC with the bottom joined to the sidewall by the conventional overlock stitch used for PP FIBCs failed at the seam joining the sidewall to the bottom panel in the cyclic top lift test at a load of 4:1 instead of at least 5:1. The failure was always at the seam joining the coat to the bottom (see Comparative Example 5).

Comparative Example 5

PET FIBC and PET-PP Hybrid FIBCs with Overlock Stitch in Cyclic Top Lift Test

The PET FIBCs and the hybrid FIBCs of Examples 1-4 with the conventional overlock stitching of the seam that is used for PP FIBCs were subjected to the cyclic top lift test. Unfortunately, both the PET FIBCs and the hybrid PET-PP FIBCs failed in this test. However, the PP FIBCs of the same sewing construction always passed the test comfortably with scores above 5× the filling load.

The following were typical parameters for the PET FIBC and a PET-PP hybrid FIBC during the test: fill weight=1.5 MT; 30 cycles of loading up to 3 MT and unloading; final break load=5.256 MT. Hence, safety factor=3.50×, and the bag did not pass the test. The minimum force should be 5× the filling load. Similar results were obtained when the filling load was reduced to 1 MT; now, a safety factor of 4× was reached. The rupture was always at the seam joining the sidewall to the bottom.

Stronger thread was tried to sew the seams joining the sidewall to the bottom panel for PET FIBCs and the hybrid FIBCs, but to no avail. Hence, it was realised that PET FIBCs cannot simply be manufactured according to the methods of the prior art used to assemble PP FIBCs. The prior art that mentions PET FIBCs do not realise this, which suggests that they were not evaluated sufficiently.

Comparative Example 6

PET FIBC with Double Row Chain Stitch

The PET FIBC was made but the sidewall and bottom fabrics were sewn but with a modification. For PP FIBCs, the double row double chain stitch is also common, like the overlock stitch. A double row chain stitch with a single fold, which was not fixed before connecting the side wall with the bottom fabric, was tried for the PET FIBC. The following were the parameters during the cyclic top lift test: fill weight=1.5 MT; 30 cycles of loading up to 3 MT and unloading; final break load=6.090 MT. Hence, safety factor=4.06, and the bag did not pass the test. The seam between the sidewall and bottom fabrics again failed prematurely.

Example 7

PET FIBC with an Edge Fold and Single Row, Double-Chain Stitch, and Modified Attachment of Unloading Spout that Passes the Safety Test A PET FIBC with sidewall and bottom and top was made from PET tape fabric, with the PET tape dimensions and properties given in the Experimental. Note as several FIBCs had to be made for this test for repeatability, these PET FIBCs were made without top panel (this is not a matter of relevance as the seam joining the top panel to the sidewall never fails). Hence the ram contacts the filled load directly to exert the force while the FIBC was suspended in mid air with the handles. The conventional sewing design for attaching the bottom panel to the sidewall based on the conventional PP FIBC was abandoned. Now, according to the invention, the edges of the side wall fabric and the bottom panel were folded (width of the fold 5 cm) and first fixed with a double chain stitch (using PP sewing thread: 1200 den). Also other stitching styles (e.g. double lock stitch) and single or multiple row seams can be used for fixing the edge folds. The width of the edge fold can be varied and the edges can be folded once or twice, but once is sufficient (this reduces the amount of fabric used).

After the above step where the edges were folded and sewn, the seam between the sidewall and bottom fabric was next made with a single row, double-chain stitch (PP sewing thread 4000 den). Once the seam attaching the sidewall to the bottom is secured with the two step process above, premature failure (bursting before attaining the safety factor of 5× the fill load) may occur near the handles. This however can be adjusted using procedures known to those skilled in the art. The transport loop (5 cm wide) was sewn onto the coat fabric using a double lock stitch at a length of 80 cm (the mentioned length is the part of the handle or loop actually attached to the side wall). There is no standard length or width for the transport loops of conventional PP FIBCs; the area which is sewn to the FIBC is adjusted to the load, so that premature failure does not occur near the handles. Moreover it is dependent on the quality of the strap and the width, which ranges from 5 cm to 20 cm usually.

The third area where the PET FIBC can fail in the cyclic top lift test is the discharge spout (36 cm diameter×46 cm length) attachment area to the bottom panel. The filling spout attached on the top fabric faces no problem and the conventional method used with PP FIBC for sewing it to the top panel can be used with the PET FIBC. But the unloading spout at the bottom bears much of the brunt of the force applied during the cyclic top lift test. In PET FIBCs with circular unloading spouts, it was found that the sewn zone attaching the spout to the bottom fabric could also fail prematurely in the cyclic top lift test if the conventional method (of PP FIBC) was used for its attachment. This problem was solved with the following innovation.

For PET FIBCs and hybrid PET-PP FIBCs with a spout, a circular opening was cut into the bottom part (as usual), but the edges of the opening were double folded and fixed first with a single row, double-chain stitch, and was then connected to the bottom panel opening using a double row, double chain stitch. To be able to fold the edges of the circular opening twice, the edges have to be cut. Also other conventional stitching styles (double lock stitch, . . . ) can be used in single or multiple rows.

Now, the PET FIBC with the new design (altered seam holding sidewall and bottom panel, and the discharge spout) passed the cyclic top lift test. The open top PET FIBC was filled with 1.5 MT and then loaded in the suspended state with 3 MT force and unloaded, for 30 cycles. After this, it was loaded to rupture. For 5 bags, the rupture occurred at loads of 7.644 MT; 8.227 MT; 8.017 MT; 7.959 MT and 7.491 MT. That is safety factors of 5.1×, 5.48×; 5.34×; 5.31; 5:0 respectively were attained with a filling load of 1.5 MT.

A PET FIBC made according to the method of the invention can now deliver advantage over PP FIBCs of the prior art: (1) it can be stacked higher than a PP FIBC and solve the problem of under-utilisation of warehouse space (2) it can be filled with materials with low inter-particle friction which could not be packaged earlier in FIBCs and (3) it can fit sea containers even after months of storage and (4) be transported safely from the production site to the warehouse by slinging it on a forklift truck, without a wooden pallet.

The invention claimed is:

1. A Flexible Intermediate Bulk Container (FIBC) having a body made of flexible fabric woven from polymeric tapes, and transport loops, wherein the body comprises side walls, bottom part, and top part, characterised in that the fabric of at least one of said side walls and transport loops is woven from uniaxially-drawn PET tape having a density greater than 1.333 g/cm$^3$.

2. The Flexible Intermediate Bulk Container (FIBC) according to claim 1, wherein at least one of the fabric of said bottom part, top part, and transport loops is woven from at least one of the group of uniaxially-drawn PP tape and uniaxially-drawn PE tape.

3. The Flexible Intermediate Bulk Container (FIBC) according to claim 1, wherein the fabric of said bottom part and top part is woven from uniaxially-drawn PET tape having a density greater than 1.333 g/cm$^3$.

4. The Flexible Intermediate Bulk Container (FIBC) according to claim 1, wherein the fabric of said transport loops is woven from uniaxially-drawn PET tape having a density greater than 1.333 g/cm$^3$.

5. The Flexible Intermediate Bulk Container (FIBC) according to claim 1, wherein the fabric of said transport loops is woven from a combination of at least one member chosen from the group of uniaxially-drawn PET tape having a density greater than 1.333 g/cm$^3$ and PP tape, and at least one member chosen from the group of PP multifilament yarn and PET multifilament yarn.

6. The Flexible Intermediate Bulk Container (FIBC) according to claim 1, wherein the fabric of said side walls, bottom part and top part and transport loops is woven from uniaxially-drawn PET tape having a density greater than 1.37 g/cm$^3$.

7. The Flexible Intermediate Bulk Container (FIBC) according to claim 1, wherein said PET has an I.V. greater than 0.55 dL/g.

8. The Flexible Intermediate Bulk Container (FIBC) according to claim 1, wherein said PET tape is chosen from the group of virgin PET recycled PET, and a mixture thereof.

9. The Flexible Intermediate Bulk Container (FIBC) according to claim 1, wherein said tape used to make the fabric is manufactured from a homoPET, or a co-PET containing comonomers up to 20% by weight.

10. The Flexible Intermediate Bulk Container (FIBC) according to claim 1, wherein said tape used to make the fabric contains one or more additives, chosen from the group of polymeric type compounds, anti-block additives, anti-slip additives, anti-splitting additives, colorants and UV stabilisers, wherein the total amount of said additives <15 wt.%, based on the total weight of the tape.

11. The Flexible Intermediate Bulk Container (FIBC) according to claim 1, wherein in said fabric comprising woven warp tape and weft tape said warp tape has a width in the range of about 1-10 mm, and a thickness in the range of about 10-100 microns, said weft tape having a width in the range of 1-10 mm and thickness in the range of 10-100.

12. The Flexible Intermediate Bulk Container (FIBC) according to claim 1, wherein the edges from said side walls and bottom part is folded once or twice and fixed together by sewing.

13. The Flexible Intermediate Bulk Container (FIBC) according to claim 1, wherein said bottom part is optionally provided with a circular spout attachment, wherein the edge of the circular bottom opening is double folded and the attaching edge of the spout is stitched to said bottom part.

14. The Flexible Intermediate Bulk Container (FIBC) according to claim 1, wherein said transport loops extend to the bottom of said FIBC and are sewn to said side wall from bottom to top.

15. The flexible Intermediate Bulk Container (FIBC) according to claim 1, wherein said FIBC is a FIBC type chosen from the group of cylindrical type, tubular type, and a U panel type.

16. The Flexible Intermediate Bulk Container (FIBC) according to claim 1,
wherein said bottom part is provided with a circular spout attachment, wherein the edge of the circular bottom opening is double folded and the attaching edge of the spout is stitched to said bottom part with a double row, double chain-stitch.

17. The Flexible Intermediate Bulk Container (FIBC) according to claim 10, wherein said polymeric type compounds are chosen from the group of HDPE, LLDPE, LDPE, polycarbonate, polypropylene, poly(ether ester) copolymers, and combinations thereof.

18. The Flexible Intermediate Bulk Container (FIBC) according to claim 12, wherein said fixing of edge folds and fixing together of said side walls, and bottom part is carried out by a single row or double row stitch.

19. The Flexible Intermediate Bulk Container (FIBC) according to claim 18, wherein said fixing of edge folds and fixing together of said side walls, and bottom part is carried out by a double lock stitching and/or double chain stitching.

* * * * *